United States Patent [19]
Beckwith et al.

[11] 3,990,309
[45] Nov. 9, 1976

[54] TEMPERATURE COMPENSATED PRESSURE LIMITED GAUGE

[75] Inventors: Richard M. Beckwith, Covina; Eric G. Himstedt, Monrovia, both of Calif.

[73] Assignee: HTL Industries, Inc., Pasadena, Calif.

[22] Filed: Sept. 8, 1975

[21] Appl. No.: 611,191

[52] U.S. Cl. ................................. 73/393; 73/418
[51] Int. Cl.² ..................... G01L 19/04; G01L 7/04
[58] Field of Search ............. 73/393, 416, 411–415, 73/417, 418, 420, 431, 395

[56] References Cited
UNITED STATES PATENTS

| | | | |
|---|---|---|---|
| 1,700,449 | 1/1929 | Reilly | 73/392 |
| 2,037,949 | 4/1936 | Tate | 73/393 |
| 2,087,494 | 7/1937 | Annin | 73/393 |
| 2,841,984 | 7/1958 | Green | 73/395 |
| 3,140,613 | 7/1964 | Hasegawa | 73/393 |
| 3,163,046 | 12/1964 | Huston | 73/418 |

*Primary Examiner*—Donald O. Woodiel
*Attorney, Agent, or Firm*—Jackson & Jones Law Corp.

[57] ABSTRACT

A temperature compensated pressure limited gauge is provided having a bourdon tube pressure sensing element. The coil is connected to a sealed cavity and has a predetermined quantity of fluid such as oil calibrated into the gauge. A solid cylinder or block of material is located within the cavity and has a relatively low volumetric thermal expansion characteristic relative to that of the fluid and of the gauge housing about the cavity. The dimensions of the block of material and housing cavity are such that their relative expansions are capable of compensating for any volumetric changes of the fluid throughout the applicable temperature range of the pressure gauge. Accordingly, a temperature compensation feature is provided that renders the pressure gauge independent of ambient thermal conditions. A fitting is included in the gauge to provide fluidic communication with the cavity. The fitting is adapted to be connected to a source of pressure to be monitored and further includes a diaphragm and a stop or limit member adjacent the diaphragm. The diaphragm separates the predetermined quantity of fluid in the pressure gauge from that of the source of pressure that is being monitored, while at the same time transmitting any changes in pressure to the fluid in the sealed cavity. The stop or limit member provides a maximum limit to the pressure that is capable of being transmitted via the diaphragm movement to the coil and thereby, protects the gauge from any destructive overload.

10 Claims, 2 Drawing Figures

TEMPERATURE COMPENSATED PRESSURE LIMITED GAUGE

BACKGROUND OF THE INVENTION

1. Field of the Invention

The present invention is directed to pressure gauges and more particularly, temperature compensated pressure limited gauges.

2. Description of the Prior Art

Various forms of temperature compensated gauges have been utilized in the prior art, for example, the aircraft industry utilizes gauges to determine whether the pressure of a fire extinguisher has leaked from a container. An example of this form of gauge is disclosed in U.S. Pat. No. 3,735,376 and is directed to determining the relative pressure condition between two containers. Another pressure differential gauge with both force compensating and temperature compensating features is disclosed in U.S. Pat. No. 3,576,412 and is utilized for determining the useful life of a blade spar of a helicopter rotor. Various other forms of temperature compensated pressure indicators for determining leakage from a high pressure container are known in the prior art.

The desirability of having a pressure gauge that is temperature compensated is particularly important in the aircraft industry. The pressure gauge on an aircraft can be subjected to rapid temperature changes and the reliability of a temperature compensated pressure gauge is contingent upon its response to temperature changes. A false alarm in a cockpit of an aircraft can cause a commercial airline to be grounded. An aircraft obviously operates at ambient surface temperatures and within minutes can be flying at subzero temperatures miles above the earth. In addition, vibration and mechanical stresses are frequently applied to the pressure gauge.

An example of a requirement of a temperature compensated gauge can be found in the Boeing 747 aircraft which requires a pressure gauge to monitor the hydraulic fluid in the aircraft's brake system. In normal use, the pressure can be approximately 200 psi; however, when the emergency braking system is activated, to lock the wheel rotation under certain operational modes such as when the aircraft is subject to full engine power, the hydraulic fluid pressure can reach 3000 psi. The pressure gauges that have been utilized in such a system have generally employed ball check valves to limit the application of the pressure to the gauge. The pressure gauge itself is required to be extremely accurate over a limited pressure range, and accordingly, this prohibits designing the gauge to be fully responsive throughout the entire range of pressure to which the gauge may be subjected. Generally, a bourdon coil is designed to sustain a 150% overpressure without damage. As known in the prior art, the more limited the range of the gauge, the easier it is to provide an accurate linear output. Other forms of pressure limited gauges can be found in U.S. Pat. No. 3,789,219.

SUMMARY OF THE INVENTION

The present invention provides a temperature compensated pressure gauge that can be isolated from extreme pressure. A pressure sensing element such as a bourdon tube coil is attached to an appropriate indicator member for providing an indication of the measured pressure. A quantity of fluid such as oil is charged within the coil and a compensator member is operatively connected to the fluid and is responsive to thermal changes for varying the cavity volume holding the fluid to substantially nullify any thermal volumetric changes in the fluid over an applicable temperature range.

The gauge housing has a cavity, or reservoir, for receiving a portion of the fluid. The compensator member can be mounted within the cavity and can comprise a material having a low volumetric thermal expansion coefficient, such as Invar. A diaphragm is mounted between the oil filled reservoir and the medium to be monitored. The diaphragm permits any changes in pressure in the monitored medium, such as fluid, to be transmitted by movement of the diaphragm to the calibrated fluid within the bourdon tube coil and cavity. An appropriate stop member, such as a clearance fitted plug or filter screen, is positioned to limit the movement of the diaphragm, and thereby, prevent harmful over-pressurization of the gauge.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

The following specification taken in conjunction with the drawings sets forth the present invention in such a manner that any person skilled in the art can make and use the present invention. The embodiment of the invention disclosed herein is the best mode contemplated by the inventors in carrying out their invention although it should be understood that various modifications can be accomplished within the parameters of the present invention.

BRIEF DESCRIPTION OF THE PREFERRED EMBODIMENT

Figure 1:
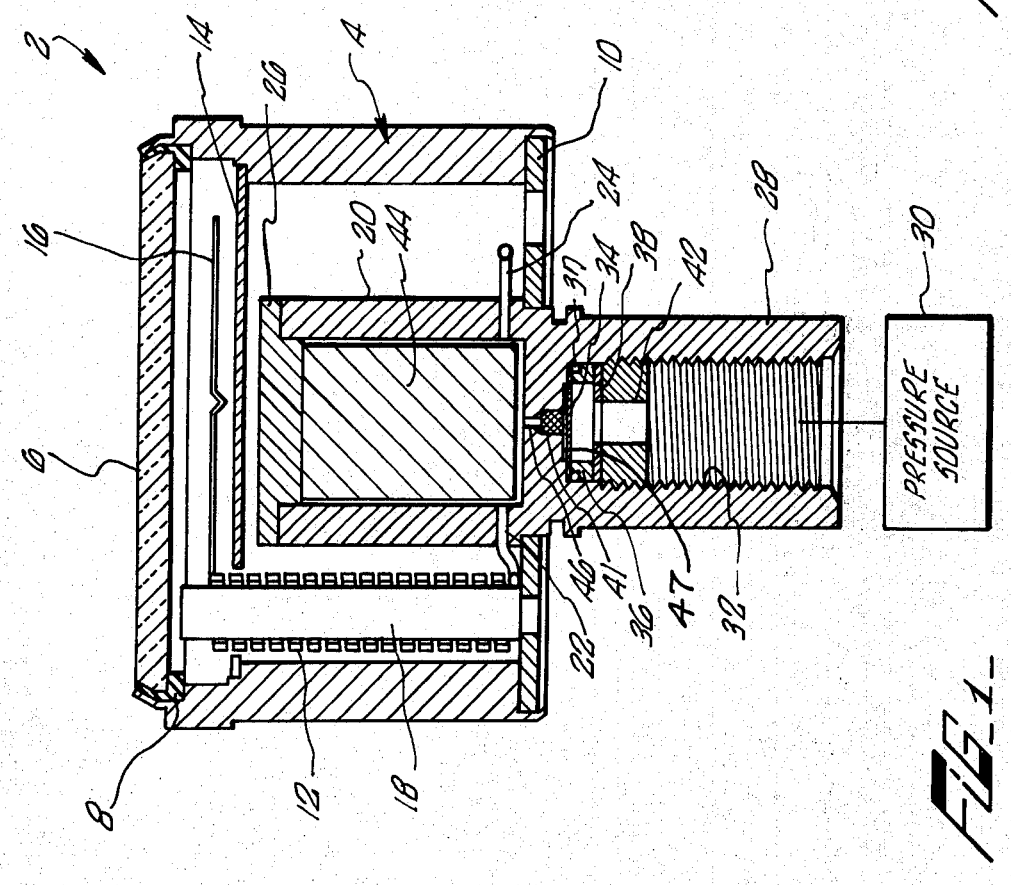
FIG. 1 is a cross-sectional view of one embodiment of the gauge of the present invention.

Referring to FIG. 1, the temperature compensated overpressure gauge 2 of the present invention, is disclosed in a cross-sectional view. The gauge casing 4 is cylindrical, but can be of any desired shape and is attached to an appropriate crystal, or window plate, 6 with a gasket 8. On the other side of the casing 4 a back plate 10 completes the exterior housing assembly.

The active sensing element of the gauge 2 is the bourdon tube coil 12 which is disclosed in the preferred embodiment in a helical winding. The dial face plate 14 is positioned beneath the crystal 6 and a pointer 16 is appropriately fastened to the bourdon coil 12. The bourdon coil 12 is essentially a flattened tube that is bent into a helix, closed at the one end and open at the other end, to receive a charge of fluid, such as oil. When pressure is aplied to the bourdon coil 12, the helix starts to unwind permitting an indication of pressure within its designed range via the pointer 16. The pointer 16 is attached to the closed end of the bourdon coil 12. The dial 14 is suitably marked with indicia at different angles and with appropriate numerals for corresponding pressures. The relative position of the pointer 16 with respect to the dial 14 indicates the monitored pressure. The bourdon coil 12 is loosely guided by a cylindrical post member 18 which is attached to the back plate 10.

Centrally located with the interior of the gauge 2 is a stainless steel reservoir housing 20, having a volumetric thermal expansion coefficient of approximately $28.8 \times 10^{-6}$ cubic inches times degrees F°/cubic inch. The reservoir housing 20 is of a cylindrical shape and is attached via conduit 22 to the bourdon coil 12. Another conduit 24 can be utilized for the initial filling of the gauge 2.

The upper portion of the reservoir housing 20 adjacent to the dial 14 is closed with a plug member 26, the lower portion of the reservoir housing 20 extends beyond its mounting in the back plate 10 to provide a fitting member 28.

The fitting member 28 is adapted to be attached to any pressure source 30 that is desired to be monitored. Basically, the fitting member 28 includes a cylindrical threaded tube portion 32 that in the embodiment of FIG. 1 has a mylar diaphragm 34 mounted adjacent the bottom surface of the fitting member 28. A pressure ring 36, with an O-ring seal 37, nut 42, and a bellville spring 38 hold the mylar diaphragm 34 in place.

Figure 2:
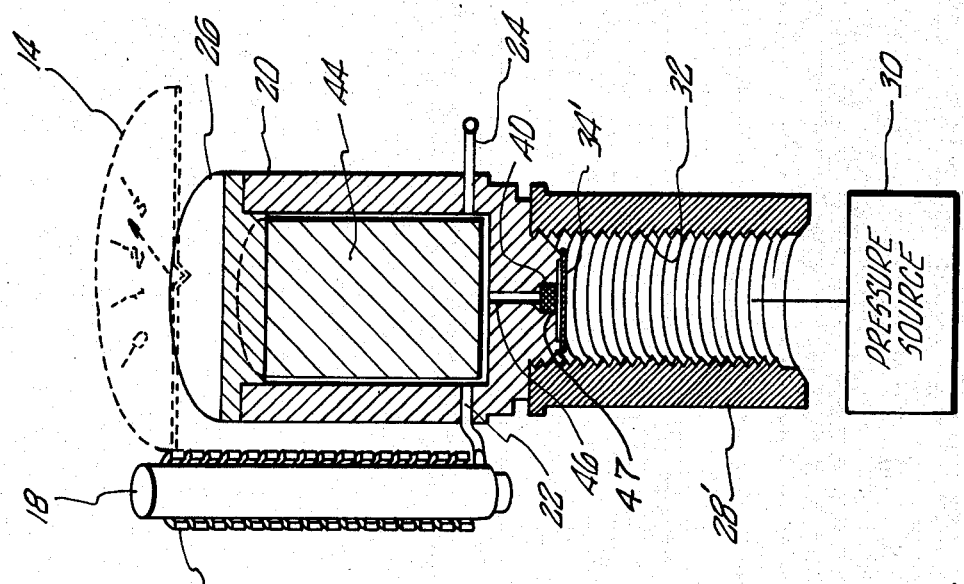
FIG. 2 is an isometric view with a section removed of another embodiment of the present invention.

Alternatively, a metal diaphragm 34', such as stainless steel, as seen in FIG. 2 may be welded onto the housing member 20 with a separate fitting member 28' attached by an appropriate threaded connection. The separate fitting member 28' facilitates the welding of the stainless steel diaphragm 34' to the reservoir housing 20. Adjacent the fitting cavity 47 and interposed in a conduit 46 from the fitting cavity 47 to the reservoir cavity is a filter plug 40, or alternatively, a loosely fitted solid plug 41, as seen in FIG. 1. Both the filter plug 40 and solid plug 41 serve a purpose of supporting the respective diaphragms at a stop, or overload position.

The filter plug 40 can provide a porous surface through which the fluid may pass, but when the stainless steel diaphragm 34' is pressed against the filter 40, due to the maximum design range of pressure, the holes are sufficiently small so that the stainless steel diaphragm 34' will not pass within or burst. As can be appreciated, the solid loosely fitting plug 41 will also support the mylar diaphragm 34 while permitting the transmission of pressure to the bourdon coil 12.

The diaphragm 34 can be a flexible membrane formed of mylar, steel, or other material which is capable of transmitting by movement a limited amount of pressure from the pressure source 30 to the sensing portion, bourdon coil 12 of the gauge 2. Additional overload pressures are excluded when the diaphragm 34 is forced against the seat, or bottom, surface of the fitting member 28 and the filter 40. The diaphragm 34 also acts as a separator between the bourdon coil 12 and the monitored system and allows no exchange of liquids or gases therebetween. Thus, the diaphragm of the present invention may sustain an overpressure in excess of 1,000%. In addition, the diaphragm separation feature can permit a gauge of the present invention to be used with corrosive liquids, or gases.

The pressure ring 36 is used to force the outer periphery of the diaphragm 34 against the bottom surface of the fitting member 28 to effect a seal with the O-ring 37. The pressure nut 42 supplies sufficient force to maintain a sealed diaphragm 34.

A cylindrical plug, or block, of a low volumetric thermal expansion material such as Invar 44 with an average volumetric thermal coefficient of $2.158 \times 10^{-6}$ cubic inches (F°) per cubic inch is mounted within the reservoir housing 20 with sufficient clearance to permit free flow through the conduit 46. The Invar material has a much lower coefficient of thermal expansion than that of the reservoir housing 20 made from a material such as stainless steel. When both the reservoir housing 20 and the compensator plug 44 are subjected to the same temperature change, there is a predictable change in the cavity volume between the two members. The fluid, such as oil, which is provided within the bourdon coil 12 and the reservoir housing 20 can be of the type that will meet the military specification, MIL-H-5606A, and can be purchased from the Bray Oil Company, Type H-515-OHA. Other fluid, as known in the art, can be utilized. The thermal expansion characteristic or volumetric changes of the oil over temperature range is predictable. The relative cavity volume in the reservoir housing 20 between the compensator plug 44 and the housing 20 is used in the present invention to match the thermal volumetric change of the oil.

In operation, the gauge is assembled as disclosed in the figures and a predetermined pressure range is utilized for the calibration of the gauge 2. In this regard, if the gauge is to be utilized on the hydraulic brake lines of a commercial aircraft, such as the Boeing 747, a pressure gauge range of zero to 300 psi is required with a maximum over pressure of approximately 3000 psi and a capability of withstanding a surging pressure of up to 5000 psi.

After evacuation to remove air within the gauge sensing chamber through the filler tube, or conduit 24, the conduit 24 is connected to an appropriate source of pressurized fluid while the fitting member 28 is connected to a known pressure reference. The reservoir housing 20 and the bourdon coil 12 is then filled with the desired charge of fluid to the appropriate calibration point, for example, 400 psi, with the fitting member pressurized to a higher pressure, for example, 3000 psi, and the filler tube 24 is then sealed. After filling and sealing of the conduit 24, the movement of the diaphragm 34 is such that it will bottom against the fitting member 28 including the filter 41 at approximately 400 psi, and thereby, isolate the gauge and prevent any overload if, for example, it is suddenly subjected to a large pressure increase in the pressure source 30. For example, in a 747 aircraft emergency braking system, the pressure can approach approximately 3000 psi but the sensing element 2 will be effectively isolated, after approximately 400 psi. In this regard, it should be noted that the design of the present gauge is particularly advantageous in a commercial aircraft since it will not be affected by vibration. But, it should be appreciated that the inventive gauge design has other aplications than that of the aircraft industry.

With the gauge of the present invention, it is possible to maintain a given amount of liquid in the space between the diaphragm 34 and the bottom of the fitting member 28 to result in a given display of pressure on the dial 14 over the applicable pressure range while the gauge is subject to a wide temperature range of $-60°$ F to a $+200°$ F. The particular sizes of the Invar plug and cavity are, of course, relative to the particular design parameters under which the gauge of the present invention is to be used. In the pressure ranges of zero to 300 psi and the temperature range of $-60°$ F to $+200°$ F, the Invar plug could be approximately 0.2 cubic inches and the oil cavity could be approximately 0.01 cubic inches. The relative choices of material that will provide an effective compensator for temperature over the applicable pressure range can vary, and accordingly, the specific materials illustrated should not be considered limiting.

As can be readily appreciated, it is possible to deviate from the above embodiments of the present invention and it will be readily understood by those skilled in the art that the invention is capable of many modifications and improvements within the scope and spirit thereof. Accordingly, it will be understood that the invention is not to be limited by the specific disclosed embodiment but only by the scope and spirit of the appended claims.

What is claimed is:

1. A temperature compensated, pressure limited pressure gauge for accurately and repetitively measuring pressure changes over a predetermined range while subject in operation to application of pressure larger than the desired range comprising:
   a housing member having a housing cavity therein;
   a pressure sensing coil fluidically connected to the cavity;
   a fitting means fluidically connected to the cavity for connecting the gauge to a source of pressure to be measured including a fitting cavity, a fluid conduit from the fitting cavity to the housing cavity a diaphragm mounted to fluidically separate the predetermined quantity of fluid from the monitored pressure and a stop member mounted adjacent the diaphragm within the fitting cavity to limit its movement, and accordingly, provide a predetermined upper limit to the pressure capable of being transmitted across the diaphragm to the pressure sensing element;
   indicator means operatively connected to the pressure sensing element for providing an indication of measured pressure; and
   an expansion member having a low thermal expansion characteristic relative to the predetermined quantity of fluid mounted in the housing cavity and responding to thermal changes for varying the volume of the cavity to substantially nullify any thermal volumetric changes in the fluid.

2. The invention of claim 1 wherein a filter means is positioned in the fitting means between the cavity and the diaphragm.

3. The invention of claim 2 wherein the diaphragm is a flat mylar member.

4. The invention of claim 1 wherein the low thermal expansion member is Invar.

5. The invention of claim 1 further including a guide post mounted within the housing member and extending within the pressure sensing coil.

6. The invention of claim 5 wherein the axis of the guide post is parallel the axis of the housing cavity.

7. The invention of claim 6 wherein the stop member is a filter means positioned within the fitting cavity.

8. The invention of claim 7 wherein the expansion member is made from a material having an average volumetric thermal expansion in the range of $2.1 \times 10^{-6}$ cubic inches X degrees F°/cubic inch.

9. An aircraft temperature compensated, pressure limited pressure gauge for accurately and repetitively measuring pressure changes over a predetermined range while subject in operation to application of pressure larger than the desired range comprising:
   a housing member having a fluid tight housing cavity therein;
   a helical pressure sensing coil fluidically connected to the cavity;
   a guide post mounted within the housing member and extending within the helical coil;
   a fitting means fluidically connected to the cavity for connecting the gauge to a source of pressure to be measured including a fitting cavity, a fluid conduit from the fitting cavity to the housing cavity, a flat diaphragm mounted to fluidically separate the predetermined quantity of fluid from the monitored pressure and a filter member mounted adjacent the diaphragm within the fitting cavity to limit its movement, and accordingly, provide a predetermined upper limit to the pressure capable of being transmitted across the diaphragm to the pressure sensing element;
   indicator means operatively connected to the pressure sensing element for providing an indication of measured pressure; and
   an expansion member having a low thermal expansion characteristic relative to the predetermined quantity of fluid mounted in the housing cavity and responding to thermal changes for varying the volume of the cavity to substantially nullify any thermal volumetric changes in the fluid.

10. The invention of claim 9 wherein the diaphragm is mylar.

* * * * *